United States Patent [19]
Frumholtz et al.

[11] Patent Number: 4,899,523

[45] Date of Patent: Feb. 13, 1990

[54] MOWER

[75] Inventors: Johny Frumholtz, Saverne; Roland Helfer, Lampertheim, both of France

[73] Assignee: Kuhn s.a., Saverne Cedex, France

[21] Appl. No.: 212,326

[22] Filed: Jun. 27, 1988

[30] Foreign Application Priority Data

Jun. 26, 1987 [FR] France ............................... 87 09182

[51] Int. Cl.$^4$ ........................................... A01D 34/66
[52] U.S. Cl. ..................................... 56/155; 56/13.6; 56/192
[58] Field of Search ................... 56/6, 13.6, 14.9, 15.2, 56/15.5, 192

[56] References Cited

U.S. PATENT DOCUMENTS

| | | | |
|---|---|---|---|
| 2,429,492 | 10/1947 | Scranton . | |
| 2,753,674 | 7/1956 | Cunningham, Jr. . | |
| 3,751,889 | 8/1973 | Overesch | 56/6 X |
| 4,178,746 | 12/1979 | Allely | 56/13.6 X |
| 4,253,294 | 3/1981 | Zweegers | 56/13.6 |
| 4,301,643 | 11/1981 | Bailey et al. | 56/6 X |
| 4,525,987 | 7/1985 | Werner et al. | 56/15.2 |
| 4,558,560 | 12/1985 | Koch | 56/192 X |
| 4,719,742 | 1/1988 | Ermacora et al. | 56/13.6 X |

FOREIGN PATENT DOCUMENTS

| | | |
|---|---|---|
| 0184533 | 6/1986 | European Pat. Off. . |
| 3527903 | 2/1987 | Fed. Rep. of Germany . |
| 2110911 | 6/1972 | France . |
| 2226101 | 11/1974 | France . |
| 2562758 | 10/1985 | France . |
| 1201938 | 8/1970 | United Kingdom . |

*Primary Examiner*—George A. Suchfield
*Attorney, Agent, or Firm*—Oblon, Spivak, McClelland, Maier & Neustadt

[57] ABSTRACT

A mower including a cutting device connected in an articulated manner to a frame, the cutting device including two groups of mowing elements and each one of the two groups of mowing elements including drive elements. A transmission means transmits movement from a driving source to the drive elements of each one of the two groups of mowing elements. The transmission means includes an input means located at least approximately in the middle of the frame seen crosswise to the direction of work and movement distribution means for distributing the movement of the input means to the drive elements. The two groups of mowing elements are connected rigidly to one another, and the cutting device is connected to the frame by a deformable quadrilateral device. The drive elements of each one of the two groups of mowing elements include a transmission that extends over the one of the mowing elements located on the outside end of the corresponding group of mowing elements. Finally, the movement distribution means of each one of the two groups of mowing elements includes a distribution shaft with universal joints, the distribution shaft conducting movement to the transmission of the corresponding group of mowing elements.

33 Claims, 6 Drawing Sheets

MOWER

FIELD OF THE INVENTION

This invention relates to a mower comprising a frame; wheels connected in an articulated manner to the frame by wheel arms so as to be able to be moved in relation to the frame to move the frame away from or closer to the ground; a tongue making it possible to hitch the mower to a tractor vehicle, the tongue being connected to the frame by a joint with a pin directed upwardly; a cutting device comprising two groups of mowing elements and connected in an articulated manner to the frame for its adaptation to the ground; transmission means for transmitting the movement from a driving source to the elements for driving each group of mowing elements, the transmission means comprising an input means located at least approximately in the middle of the frame seen crosswise to the direction of work and movement distribution means for distributing the movement of the input means to the driving elements.

BACKGROUND OF THE INVENTION

Such a mower is known having two groups of mowing elements each of which is connected to the frame by arms extending at least approximately horizontally backwards from the corresponding group of mowing elements. At its back end, each of these arms is connected to the frame by a joint with a horizontal axis directed crosswise to the direction of work. Thanks to this connection method, each group of mowing elements can be individually adapted to the configuration of the ground over which it slides while pivoting around the horizontal axis directed crosswise to the direction of work.

The driving of the two groups of mowing elements is achieved by an input means that extends to an upper level. The movement of the input means is distributed to each group of mowing elements by distribution means that extend to a lower level. These distribution means comprise a transmission having a dual output extending at the level of the horizontal axis around which the groups of mowing elements pivot for their adaptation to the ground. Each output of this transmission is coupled to the driving elements of the respective group of mowing elements. These driving elements comprise a shaft located concentrically to the horizontal axis (i.e., directed crosswise to the direction of work) and connected in rotation by a pair of beveled gears to a shaft housed in at least one of the arms connecting the group of mowing elements to the frame. The latter shaft then drives gears housed under the mowing elements.

This known method of connecting the groups of mowing elements to the frame and this method of driving the groups of mowing elements exhibit drawbacks.

First, the known method necessitates the furnishing of an element for transporting the product cut by the mowing elements so that the product cannot remain hooked on the frame element that supports the groups of mowing elements and that partially contains the driving elements of the groups of mowing elements. This increases the cost of the mower.

Second, the known method requires the furnishing of means for preventing the hooking of cut product on the movement distribution means extending between the input means and the drive elements of the groups of mowing elements. These means are located in the product flow in front of the movement distribution means and divide the product flow into two flows, one on either side of the movement distribution means. The mower thus leaves in its wake two separate windrows of cut product, which is often not desired.

Finally, because the two groups of mowing elements are not directly connected to one another and can, therefore, move freely in relation to one another, it can happen that, at the site situated between the two groups of mowing elements, two zones appear in which the plant bases remaining after the cutting have different heights because one of the groups of mowing elements has worked higher than the other. This is not desired either.

OBJECT OF THE INVENTION

This invention has as its object the elimination or amelioration of the drawbacks of the known mower.

SUMMARY OF THE INVENTION

For this purpose, the mower according to this invention is characterized by the combination of the following means:
- the two groups of mowing elements are connected rigidly to one another;
- the cutting device is connected to the frame by a deformable quadrilateral device;
- the drive elements of each group of mowing elements comprise a transmission that extends over the mowing element located on the outside end of the corresponding group of mowing elements; and
- the movement distribution means of each group of mowing elements comprise a distribution shaft with universal joints conducting the movement to the transmission of the corresponding group of mowing elements.

Thanks to the arrangement according to this invention, the drawbacks which affect the mower of the prior art are eliminated or, at least, substantially ameliorated.

First, because the two mowing groups are rigidly connected to one another, zones no longer appear that exhibit bases cut at different heights between the two groups of mowing elements.

Second, taking into account the method of connecting the cutting device to the frame, it follows that the cutting device comprises a much better adaptation to the soil. The quality of the mowing is thus improved. In addition, the cutting device is also much less sensitive to obstacles that it might encounter during mowing. The deformable quadrilateral device allows the cutting device a wide clearing path, which makes it possible for the cutting device easily to overcome an obstacle.

Finally, the particular arrangement of the drive elements of the mowing elements which comprise a transmission that extends above the mowing element located on the outside end of the corresponding group of mowing elements and the particular arrangement of the movement distribution means for each group of mowing elements in the form of a distribution shaft with universal joints makes it possible to drive in an optimal manner the cutting device in all the positions that the deformable quadrilateral device allows the cutting device to have.

Thanks to this particular embodiment of the connection of the cutting device to the frame and of the drive of the cutting device, it is possible to design a mower of great cutting width that does not require either an element for transporting the cut product to prevent the cut product from remaining hooked on a frame element or means preventing the hooking of cut product to the movement distribution means. In addition, the mower according to the invention makes it possible to make a single windrow, which is advantageous in several respects.

Advantageously, the deformable quadrilateral device is a pulled deformable quadrilateral device.

Preferably, the deformable quadrilateral device is at least approximately a deformable parallelogram device.

The mower according to the invention is particularly easy to handle when, in a way known in the art, the joint connecting the tongue to the frame is placed at least approximately in the middle of the frame seen crosswise to the direction of work. Thanks to this characteristic, the mower can be designed so as to be able to work either on the right or on the left of the tractor vehicle.

According to a first embodiment of the invention, the input means is composed of two parts, a first part connected to the tongue and a second part connected to the frame. Both parts are able to rotate in relation to one another around an axis merged with the axis of the joint connecting the tongue to the frame. In this embodiment, the part connected to the tongue is able to rotate in relation to the part connected to the frame without danger of damaging the transmission elements housed in the input means.

According to a second embodiment, the transmission means comprise a transmission shaft. The input means comprises an input shaft and is connected to the frame. The connection between the transmission shaft and the input shaft is made by a universal joint the axis of which is at least approximately merged with the axis of the joint connecting the tongue to the frame. Advantageously, the universal joint is a homokinetic joint.

According to a third embodiment, the input means is connected to the tongue. In this case, it will be particularly advantageous that, on the side of the input means, each distribution shaft with universal joints comprises a homokinetic joint.

In the second and third embodiments, the input means comprises only a single part.

For mowers of relatively wide cutting width, it is advantageous to reduce or eliminate the vibrations to which the distribution shafts with universal joints could be subjected. To this end, the movement distribution means of a group of mowing elements comprises, in addition, an extension shaft which is connected at one of its ends to the input means and which is guided in rotation at least close to the other of its ends in a bearing solid with the frame. The individual distribution shafts with universal joints extending between the frame end of the extension shaft and the transmission housing of the corresponding group of mowing elements.

In the invention, there can be provided, after the mowing elements, elements for processing the cut product, such as elements for windrowing, conditioning, or the like.

DETAILED DESCRIPTION OF THE PRESENTLY PREFERRED EMBODIMENTS

Figure 1:
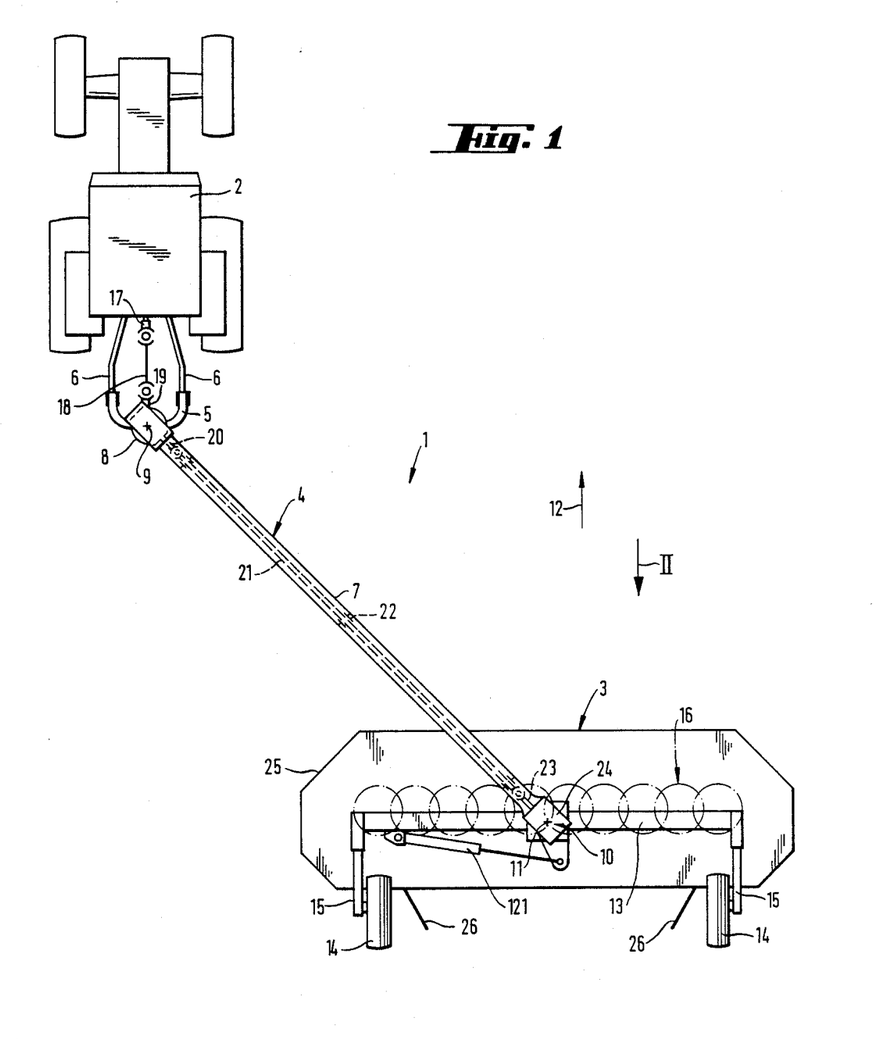
FIG. 1 is a top view of a mower according to the invention, hitched to a farm tractor.

In FIG. 1, a mower (1) according to the invention is seen connected to a tractor (2) having a power takeoff (17).

The mower (1) is composed of a body (3) and a tongue (4). The tongue (4) is composed of a primary tongue (5) size, shaped, and positioned to be connected to lower arms (6) of the coupling of the tractor (2) and a secondary tongue (7) connected to the body (3) of the mower (1). The primary tongue (5) is connected to the front part of the secondary tongue (7) by a connecting device (8) known in the art and comprising an input shaft (19) and an output shaft (20). The connecting device (8) allows a pivoting of the primary tongue (5) in relation to the secondary tongue (7) around an axis (9) directed upwardly. At its back part, the secondary tongue (7) is connected to the body (3) by a joint (10) with an axis (11) directed upwardly and extending at least approximately to the middle of body (3) seen crosswise to the direction of work (12). The position of the tongue (4) in relation to the body (3) can be adjusted by causing the tongue (4) to pivot around the axis (11) of the joint (10). The adjusting of the desired position and the keeping of the body (3) in the desired position are achieved by a locking and control element (121) (which is a hydraulic cylinder in the example shown). Thanks to this arrangement, the body (3) of the mower (1) can extend —seen from the back in the direction of work (12) —either to the right or to the left of the tractor (2). This allows to-and-fro mowing.

The body (3) of the mower (1) comprises a frame (13) which rests on the ground by means of two wheels (14) which extend to the rear of the frame (13). The wheels (14) are each jointedly connected to the frame (13) by means of a wheel arm (15) so as to be able to be moved in relation to the frame (13) thanks to the action of a control means (315) (which is a hydraulic cylinder in the example shown —see FIG. 3) to move the frame (13) away from the ground in the transport phase and to move the frame (13) closer to the ground in the work phase.

Further, the body (3) of the mower (1) comprises a cutting device (16) supported by the frame (13). The cutting device (16) as well as its connection to the frame (13) will be described later in greater detail. The driving of the cutting device (16) is achieved from the power takeoff (17) of the tractor (2) which, by a shaft (18) having a universal joint at either end, drives the input shaft (19) of the connecting device (8). The connecting device (8) is also —in a way known in the art —a movement transmission device. The output shaft (20) of the connecting and transmission device (8) transmits the movement to a transmission shaft (21) which is housed inside of the secondary tongue (7). Considering the great length of the transmission shaft (21), it is guided in rotation in the secondary tongue (7) by means of at least one bearing (22). The transmission shaft (21) drives an input shaft (23) of an input means (24) which extends at the level of the connection of the secondary tongue (7) to the frame (13) and which transmits the movement to the cutting device (16) in a way which will be described in greater detail below.

Finally, in FIG. 1 it is seen that the body (3) of the mower (1) is provided with a protective device (25) and windrowing elements (26).

Figure 2:
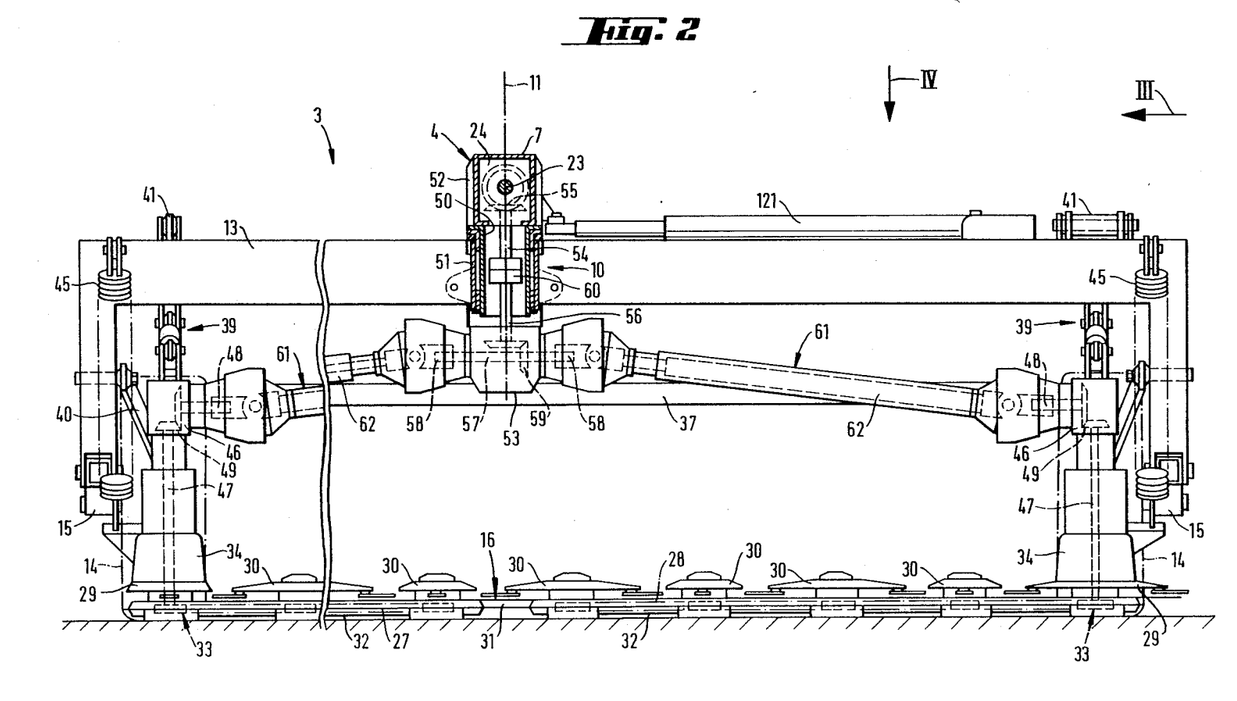
FIG. 2 is a front view along the arrow II in FIG. 1 of the body of the mower according to FIG. 1, partially section along the plane II—II in FIG. 3.
Figure 3:
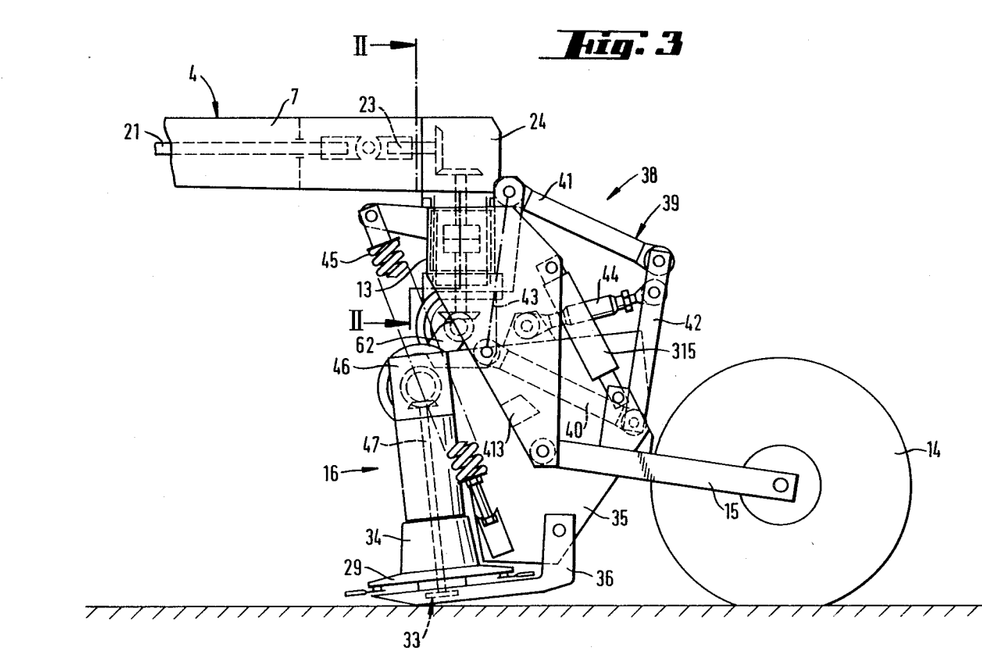
FIG. 3 is a side view along the arrow III in FIG. 2 of the body of the mower of FIGS. 1 and 2.
Figure 4:
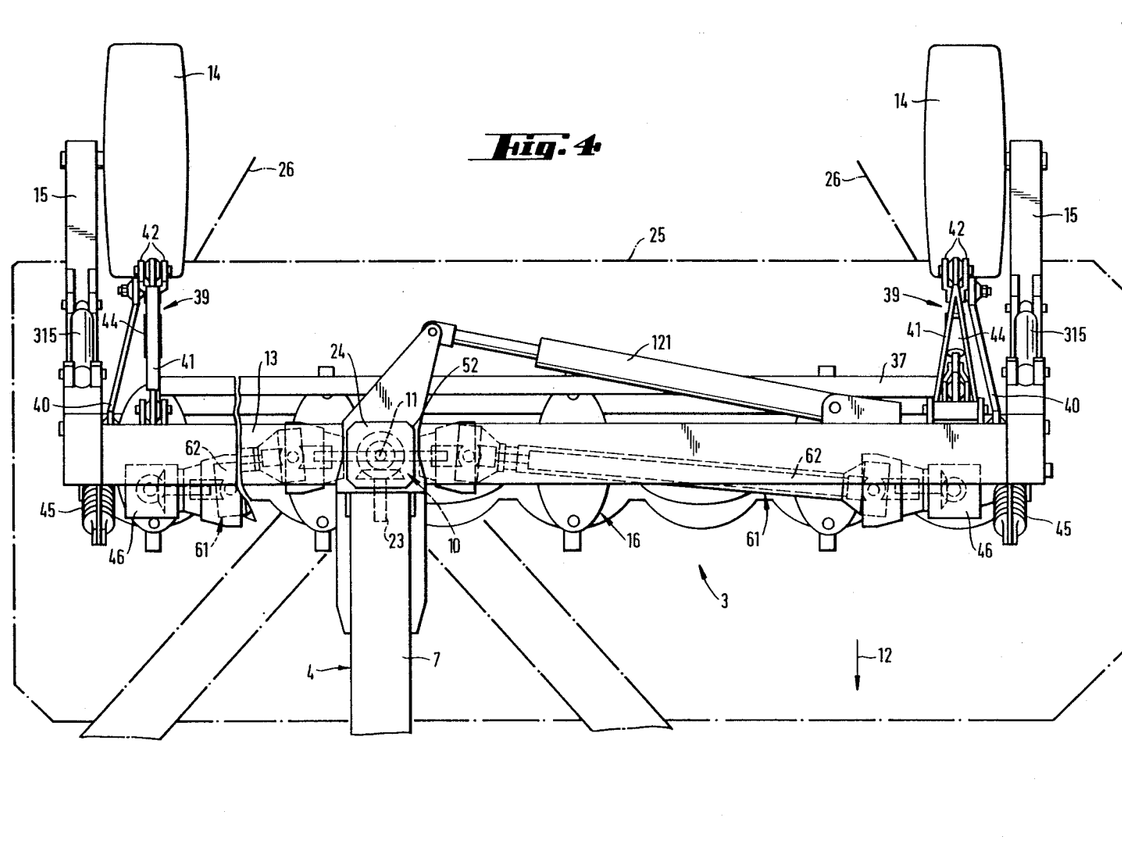
FIG. 4 is a top view along the arrow IV in FIG. 2 of the body of the mower of FIGS. 1 to 3, the tongue being shown in its middle position.

In FIGS. 2, 3, and 4, the body (3) of the mower (1) is shown in greater detail. To avoid overloading the figures and to see the various elements of the body (3) well, the protective device (25) and the windrowing elements (26) have not been shown in detail.

The cutting device (16) comprises two groups (27, 28) of mowing elements (29, 30) which are connected rigidly to one another by means of a connecting device (31). In the example shown, the mowing elements (29, 30) of each group (27, 28) are disks guided in rotation around axes directed upwardly in a corresponding housing (32) which contains a portion of the drive elements (33) of the disks. This arrangement is known in the art and, therefore, will not be described in greater detail. The mowing element (29) extending at the outside end of each group (27, 28) is surmounted by a drum (34). Behind each drum (34) extends a lateral wall (35) connected to a corresponding group (27, 28) of mowing elements (29, 30) by a foot (36). At their upper part, the two lateral walls (35) are connected to one another by a brace pipe (37), so that the cutting device (16) forms a very rigid unit.

The cutting device (16) is connected to the frame (13) so as to be able to be easily adapted to the configuration of the ground for a good cutting quality. This connection is made by a deformable quadrilateral device (38) which comprises two assemblies (39), one at each end of the cutting device (16). This deformable quadrilateral device (38) (which is at least approximately a parallelogram in the example shown) can be seen clearly in FIG. 3. Each assembly (39) comprises:

- a lower connecting rod (40) jointedly connected at its front end to the frame (13) and at its back end to the adjacent lateral wall (35), the back end normally extending to a lower level than the front end;
- an upper connecting rod (41) extending at least approximately parallel to the lower connecting rod (40) and jointedly connected at its front end to the frame (13);
- (a back connecting rod (42) jointedly connected at its upper end to the back end of the upper connecting rod (41) and at its lower end to the adjacent lateral wall (35) (in the example shown, the axis of the jointed connection of the back connecting rod (42) to the lateral wall (35) is merged with the axis of the jointed connection of the lower connecting rod (40) to the lateral wall (35)); and
- an imaginary front connecting rod (43) formed by the junction line (shown in heavy dot-and-dash line) drawn between the front joints connecting the lower connecting rod (40) and the upper connecting rod (41) to the frame (13) (the imaginary front connecting rod (43) being at least approximately parallel to the back connecting rod (42)).

Each assembly (39) is thus arranged so that the frame (13) pulls the cutting device (16).

In FIG. 3, it is further seen that each assembly (39) comprises an element (44) for regulating the cutting angle of the cutting device (16). The element (44) is jointedly mounted between the corresponding lateral wall (35) and the back connecting rod (42). The length of the element (44) is variable. Accordingly, by modifying its length, the initial position of the deformable quadrilateral device (38) in relation to the ground is modified, which has the effect of modifying the cutting angle of the mowing elements (29, 30).

To reduce the force with which the cutting device (16) rests on the ground during work, each end of the cutting device (16) is provided with a lightening device (45) (which is a spring in the example shown) connected at one end to the frame (13) and, at the other end, to the corresponding lateral wall (35).

To lift the cutting device (16) from the ground when it is put in its transport position, stops (413) are provided on which the lower connecting rods (40) rest when the frame (13) is moved away from the ground by the control means (315). It will be noted that the stops (413) do not interfere with the clearance of the deformable quadrilateral device (38) during work.

On the upper front part of each lateral wall (35) is also fastened a transmission (46) which extends above the corresponding outside mowing element (29). The transmission (46) of each group (27, 28) s part of the drive elements (33) of that group (27, 28) and is connected to the part of the drive elements (33) housed in the corresponding housing (32) by means of a shaft (47) directed downwardly. The shaft (47) extends inside the drum (34) provided above the corresponding outside mowing element (29). Further, each transmission (46) comprises an input shaft (48) which extends (in the example shown) crosswise to the direction of work (12) and is directed toward the middle part of the cutting device (16). On the inside of the transmission (46), the shaft (47) and the input shaft (48) are connected by a pair of gears (49).

In FIGS. 2 to 4 are found the joint (10) connecting the secondary tongue (7) to the body (3) and the input means (24). These can be seen particularly well in FIG. 2. At its back part, the secondary tongue (7) is provided with a hub (50) centered on the axis (11) and extending downwardly. The hub (50) is guided in rotation in a bearing (51) also centered on the axis (11) and solid with the frame (13). The guiding in rotation as well as the axial connection between the hub (50) and the bearing (51) have not been detailed because they are within the scope of the art.

The input means (24) is composed of two parts, an upper part (52) solid with the secondary tongue (7) and a lower part (53) solid with the frame (13). The upper part (52) supports, on the one hand, the input shaft (23) and, on the other hand, an intermediate output shaft (54). The input shaft (23) and the intermediate output shaft (54) are connected by a pair of gears (55). The lower part (53) supports, on the one hand, an intermediate input shaft (56) and, on the other hand, an output shaft (57). The output shaft (57) has two ends (58) which come out of the lower part (53) and which extend at least approximately parallel to the input shafts (48) of the corresponding transmissions (46). The intermediate input shaft (56) and the output shaft (57) are connected by a pair of gears (59). Further, the intermediate output shaft (54) of the upper part (52) and the intermediate input shaft (56) of the lower part (53) are connected by a coupling (60). Finally, the intermediate output shaft (54) and the intermediate input shaft (56) are arranged so that their respective axes of rotation are merged with the axis (11) of the joint (10). In this way, the upper part (52) can rotate with the tongue (4) in relation to the lower part (53) around the axis (11) without introducing stresses into the intermediate shafts (54 and 56).

The movement available to the output shaft (57) is then distributed to the groups (27, 28) of mowing elements by a movement distribution means (61). The movement distribution means (61) comprises, for each group (27, 28) of mowing elements, a distribution shaft (62) with universal joints connecting the input shaft (48) of the transmission (46) of a group (27, 28) to the corresponding end (58) of the output shaft (57) of the input means (24).

Figure 5:
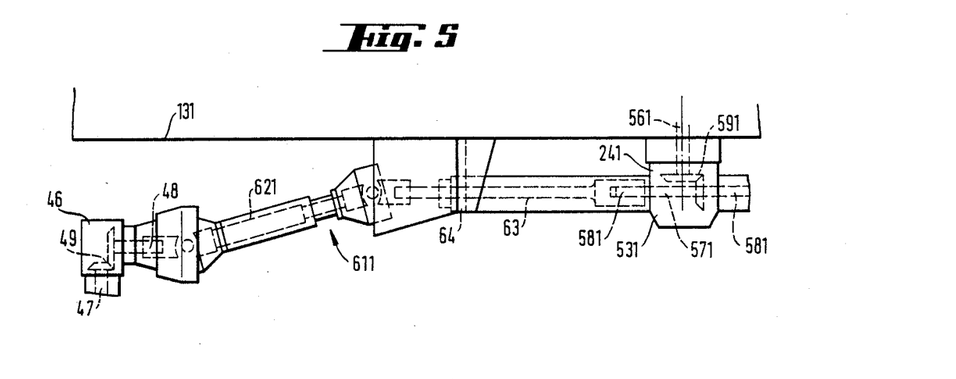
FIG. 5 shows diagrammatically in front view a second embodiment of the movement distribution means.

FIG. 5 shows diagrammatically a second embodiment of the movement distribution means (611). In this embodiment, the movement distribution means (611) comprise for each group (27, 28) of mowing elements an extension shaft (63) which is connected at one of its ends to the corresponding end (581) of the output shaft (571) of the input means (241) and which is guided in rotation at least close to the other of its ends in a bearing (64) solid with the frame (131). Between the latter end of the extension shaft (63) and the input shaft (48) of the corresponding transmission (46) extends a distribution shaft (621) with universal joints. In FIG. 5, it is also seen that the extension shaft (63) and the distribution shaft (621) with universal joints have at least approximately the same length.

Figure 6:
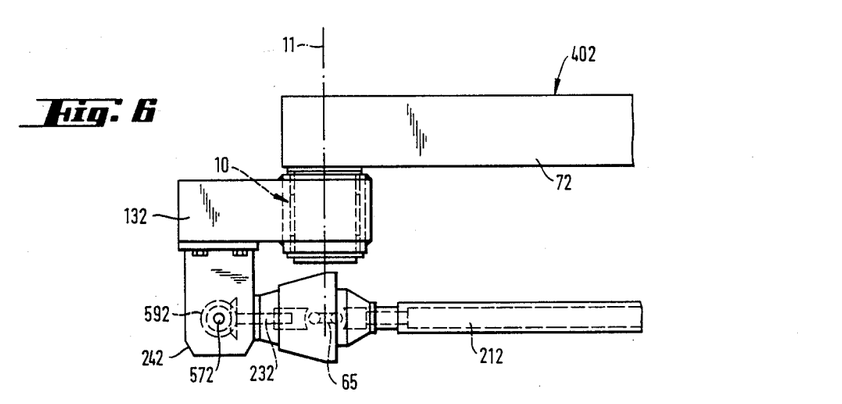
FIG. 6 shows diagrammatically in side view a second embodiment of the input means.

FIG. 6 shows diagrammatically a second embodiment of an input means (242). The input means (242) is fastened to the frame (132) and extends to the rear of the axis (11) of the joint (10) connecting the secondary tongue (72) to the frame (132). The input means (242) is provided with an input shaft (232) and with an output shaft (572) which is connected to the input shaft (232) by a pair of gears (592). The transmission shaft (212), which transmits the movement from the front part of the tongue (402), is connected to the input shaft (232) of the input means (242) by a homokinetic universal joint (65) the axis of which is at least approximately merged with the axis (11) of the joint (10) which connects the tongue (402) to the frame (132). From the output shaft (572) of the input means (242), the movement is then distributed to the groups (27, 28) of mowing elements by the distribution means (61 or 611).

Figure 7:
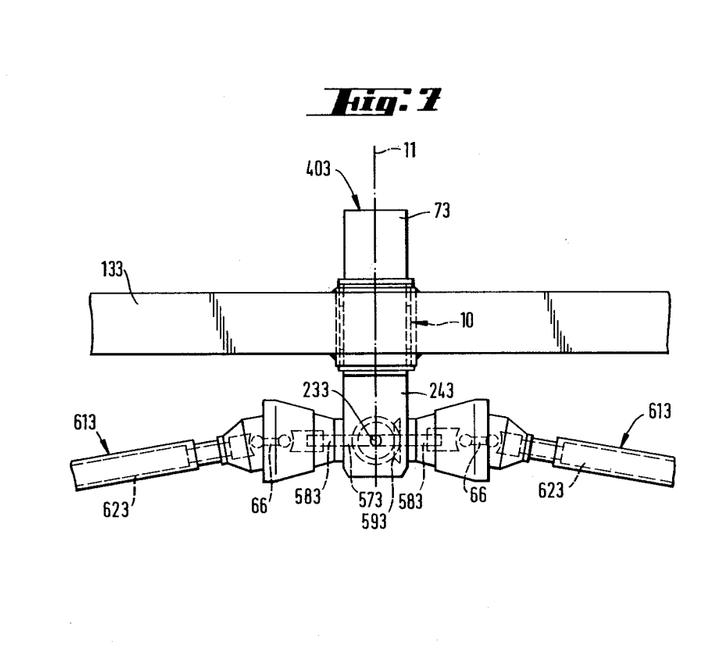
FIG. 7 shows diagrammatically in front view a third embodiment of the input means.
Figure 8:
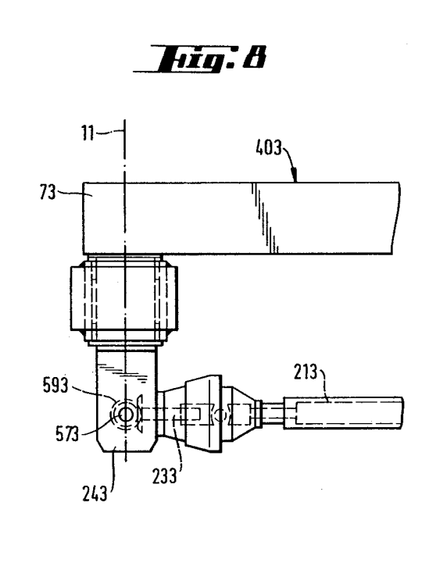
FIG. 8 shows diagrammatically in side view the input means of FIG. 7.

FIGS. 7 and 8 show diagrammatically a third embodiment of an input means (243). The input means (243) is fastened to the secondary tongue (73) and is provided with an input shaft (233) and with an output shaft (573) which is connected to the input shaft (233) by a pair of gears (593). The transmission shaft (213) which transmits the movement from the front part of the tongue (403) is connected to the input shaft (233) of the input means (243). From the output shaft (573) of the input means (243), the movement is distributed to the groups (27, 28) of mowing elements by movement distribution means (613). The movement distribution means (613) comprise (for each group (27, 28) of mowing elements) a distribution shaft (623) with universal joints. The distribution shafts (623) —on the side where they are connected to the output shaft (573) —comprise a homokinetic universal joint (66).

Obviously, numerous modifications and variations of the present invention are possible in light of the above teachings. It is therefore to be understood that, within the scope of the appended claims, the invention may be practiced otherwise than as specifically described herein.

What is new and desired to be secured by Letters Patent of the United States is:

1. A mower comprising:
   (a) a frame;
   (b) a plurality of wheels connected in an articulated manner to said frame by wheel arms so as to be able to be moved in relation to said frame to move said frame away from or closer to the ground;
   (c) a tongue which, in use, makes it possible to hitch said mower to a tractor vehicle, said tongue being connected to said frame by a joint with an axis directed upwardly;
   (d) a cutting device connected in an articulated manner to said frame, said cutting device comprising two groups of mowing elements and each one of said two groups of mowing elements comprising drive elements; and
   (e) transmission means for transmitting the movement from a driving source to said drive elements of each one of said two groups of mowing elements, said transmission means comprising:
      (i) an input means located at least approximately in the middle of said frame seen crosswise to the direction of work and
      (ii) movement distribution means for distributing the movement of said input means to said drive elements, wherein:
   (f) said two groups of mowing elements are connected rigidly to one another;
   (g) said cutting device is connected to said frame by a deformable quadrilateral device;
   (h) said drive elements of each one of said two groups of mowing elements comprises a transmission member that extends over the one of said mowing elements located on the outside end of the corresponding group of mowing elements; and
   (i) said movement distribution means of each one of said two groups of mowing elements comprises a distribution shaft with universal joints, said distribution shaft conducting the movement to said transmission member of said corresponding group of mowing elements.

2. A mower according to claim 1 wherein said deformable quadrilateral device is a pulled deformable quadrilateral device.

3. A mower according to claim 1 wherein said deformable quadrilateral device is at least approximately a parallelogram device.

4. A mower according to claim 1 wherein said deformable quadrilateral device comprises two assemblies, each one of which extends in the vicinity of an end of said cutting device.

5. A mower according to claim 1 wherein said joint is located at least approximately in the middle of said frame seen crosswise to the direction of work.

6. A mower according to claim 5 wherein said tongue is provided at its back end with a hub directed downwardly and guided in rotation around the axis of said joint in a bearing solid with said frame.

7. A mower according to claim 5 wherein said input means is composed of two parts, a first part connected to said tongue and a second part connected to said frame, the two parts being able to rotate in relation to one another around an axis merged with the axis of said joint.

8. A mower according to claim 7 wherein:

(a) said first part comprises an intermediate output shaft the axis of which is at least approximately merged with the axis of said joint;
(b) said second part comprises an intermediate input shaft the axis of which is also at least approximately merged with the axis of said joint; and
(c) said intermediate output shaft and said intermediate input shaft are connected by a coupling.

9. A mower according to claim 5 wherein:
(a) said transmission means further comprise a transmission shaft;
(b) said input means comprises an input shaft and is connected to said frame; and
(c) said transmission shaft and said input shaft are coupled to each other by means of a universal joint the axis of which is at least approximately merged with the axis of said joint.

10. A mower according to claim 9 wherein said universal joint is a homokinetic joint.

11. A mower according to claim 5 wherein said input means is connected to said tongue.

12. A mower according to claim 11 wherein:
(a) each one of said distribution shafts with universal joints has an end extending near said input means and
(b) at said end each one of said distribution shafts with universal joints comprises a homokinetic joint.

13. A mower according to claim 1 wherein said movement distribution means of each one of said two groups of mowing elements comprises, in addition, an extension shaft which is connected at a first end to said input means and which is guided in rotation at least close to a second end in a bearing solid with said frame, the respective distribution shaft with universal joints extending between said second end of said extension shaft and said transmission member of said corresponding group of mowing elements.

14. A mower according to claim 13 wherein the corresponding extension shaft and distribution shaft with universal joints have at least approximately the same length.

15. A mower according to claim 1 and further comprising, behind said cutting device, means for processing the cut product.

16. A mower according to claim 15 wherein said means for processing the cut product comprise windrowing elements.

17. A mower comprising:
(a) a frame;
(b) a plurality of wheels connected in an articulated manner to said frame by wheel arms so as to be able to be moved in relation to said frame to move said frame away from or close to the ground;
(c) a tongue which, in use, makes it possible to hitch said mower to a tractor vehicle, said tongue being connected to said frame by a joint with an axis directed upwardly;
(d) a cutting device connected in an articulated manner to said frame, said cutting device comprising two groups of mowing elements and each one of said two groups of mowing elements comprising drive elements, and
(e) transmission means for transmitting the movement from a driving source to said drive elements of each one of said two groups of mowing elements, said transmission means comprising:
(i) an input means located at least approximately in the middle of said frame seen crosswise to the direction of work and
(ii) movement distribution means for distributing the movement of said input means to said drive elements, wherein:
(f) said two groups of mowing elements are connected rigidly to one another;
(g) said cutting device is connected to said frame by a deformable quadrilateral device;
(h) said drive elements of each one of said two groups of mowing elements comprises a transmission member, that extends over one of said mowing elements of the corresponding group of mowing elements; and
(i) said movement distribution means comprises distribution shaft means with universal joints, said distribution shaft means with universal joints conducting the movement to said transmission members of said two groups of mowing elements.

18. A mower according to claim 17 wherein said deformable quadrilateral device is a pulled deformable quadrilateral device.

19. A mower according to claim 17 wherein said deformable quadrilateral device is at least approximately a parallelolgram device.

20. A mower according to claim 17 wherein said deformable quadrilateral device comprises two assemblies, each one of which extends in the vicinity of an end of said cutting device.

21. A mower according to claim 17 wherein:
(a) each one of said two groups of mowing elements comprises two ends and
(b) the transmission member of each one of said two groups of mowing elements extends over the one of said mowing elements located at one of said two ends of the corresponding group of mowing elements.

22. A mower according to claim 17 wherein said distribution shaft means with universal joints comprises two distribution shafts, each one of which conducting the movement to said transmission member of said corresponding group of mowing elements.

23. A mower according to claim 17 wherein said joint is located at least approximately in the middle of said frame seen crosswise to the direction of work.

24. A mower according to claim 23 wherein said tongue is provided at its back end with a hub directed downwardly and guided in rotation around the axis of said joint in a bearing solid with said frame.

25. A mower according to claim 23 wherein said input means is composed of two parts, a first part connected to said tongue and a second part connected to said frame, the two parts being able to rotate in relation to one another around an axis merged with the axis of said joint.

26. A mower according to claim 25 wherein:
(a) said first part comprises an intermediate output shaft the axis of which is at least approximately merged with the axis of said joint;
(b) said second part comprises an intermediate input shaft the axis of which is also at least approximately merged with the axis of said joint; and
(c) said intermediate output shaft and said intermediate input shaft are connected by a coupling.

27. A mower according to claim 23 wherein:
(a) said transmission means further comprise a transmission shaft;

(b) said input means comprises an input shaft; and
(c) said transmission shaft and said input shaft are coupled to each other by means of a universal joint.

28. A mower according to claim 23 wherein:
(a) said transmission means further comprise a transmission shaft;
(b) said input means comprises an input shaft and is connected to said frame; and
(c) said transmission shaft and said input shaft are coupled to each other by means of a universal joint the axis of which is at least approximately merged with the axis of said joint.

29. A mower according to claim 28 wherein said universal joint is a homokinetic joint.

30. A mower according to claim 17 wherein said movement distribution means comprises, in addition, extension shaft means which is connected at a first end to said input means and which is guided in rotation at least close to a second end in a bearing solid with said frame, said distribution shaft means with universal joints extending between said second end of said extension shaft means and said transmission members of said two groups of mowing elements.

31. A mower according to claim 30 wherein said extension shaft means and said distribution shaft means with universal joints have at least approximately the same length.

32. A mower according to claim 17 and further comprising, behind said cutting device, means for processing the cut product.

33. A mower according to claim 32 wherein said means for processing the cut product comprise windrowing elements.

* * * * *